(12) United States Patent
Schloss et al.

(10) Patent No.: US 6,220,101 B1
(45) Date of Patent: Apr. 24, 2001

(54) APPARATUS FOR MEASURING MULTIPLE PRESSURES

(75) Inventors: James Schloss, Tigard, OR (US); James Seefeldt, Deforest; Carol Spicuzza, Janesville, both of WI (US); Gary Ryall, Roscoe, IL (US); Wendell McCulley, Janesville, WI (US); Paul Rozgo, Janesville, WI (US); Jesse Marcelle, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 0 days.

(21) Appl. No.: 09/241,959

(22) Filed: Feb. 2, 1999

Related U.S. Application Data

(60) Provisional application No. 60/073,487, filed on Feb. 3, 1998.

(51) Int. Cl.⁷ ....................................................... G01L 7/00
(52) U.S. Cl. .................................................................. 73/756
(58) Field of Search .............................. 73/720, 721, 724, 73/718, 726, 727, 708, 756

(56) References Cited

U.S. PATENT DOCUMENTS

| | | | |
|---|---|---|---|
| 4,872,349 | * 10/1989 | Espiritu-Santo | 73/727 |
| 5,003,818 | 4/1991 | Hoodenpyle et al. | 73/121 |
| 5,564,434 | * 10/1996 | Halperin et al. | 73/724 |
| 5,584,543 | 12/1996 | Sawada | 303/191 |
| 5,592,384 | 1/1997 | Wolf | 364/424 |

* cited by examiner

Primary Examiner—William Oen
(74) Attorney, Agent, or Firm—Michael Best & Friedrich, LLP

(57) ABSTRACT

The apparatus includes a housing; a plurality of sensors mounted on the housing, each of the sensors including a sensing element and an electrical output connected to said sensing element. The apparatus also includes a plurality of inputs connected to the sensors, respectively, to transmit to the sensors. A circuit is mounted in the housing and in electrical connection with the electrical outputs to provide a common signal conditioner for the sensors.

10 Claims, 6 Drawing Sheets

APPARATUS FOR MEASURING MULTIPLE PRESSURES

This application claims benefit to Provisional Application No. 60/073,487, filed Feb. 3, 1998.

BACKGROUND OF THE INVENTION

The invention relates to measuring pressure, and particularly to using a series of sensors to measure a variety of different pressures in a system.

In many different systems, and particularly, in the braking system of an automobile, it is often necessary to measure a variety of different pressures in the system. These measurements are then used to indicate the operating condition of the system or to control the operation of the system. In the case of an automobile braking system, brake fluid pressures in each of the brake fluid lines are measured and these measurements are used to control the braking force of the brakes at each wheel end housing. In known systems for measuring brake fluid pressure, a pressure sensor is usually mounted in the wheel end housing in fluid communication with the break fluid to measure the pressure of the brake fluid. Each of these pressure sensors requires temperature compensation and signal conditioning, as well as an electrically conductive cable connecting the pressure sensor to the electrical system of the automobile.

SUMMARY OF INVENTION

The use of a different discrete sensor for each of the brake lines wherein each sensor has its own connecting cable, signal conditioning circuitry, and temperature compensation circuitry, adds to the cost of the brake system and can compromise the reliability of the system. Accordingly, the invention provides a housing having a plurality of mounting apertures and a plurality of sensors mounted in the mounting apertures, respectively. A plurality of lines are connected at one end to the sensors, respectively. The housing includes signal conditioning and temperature-compensating circuitry for each of the pressure sensors.

Figure 1:
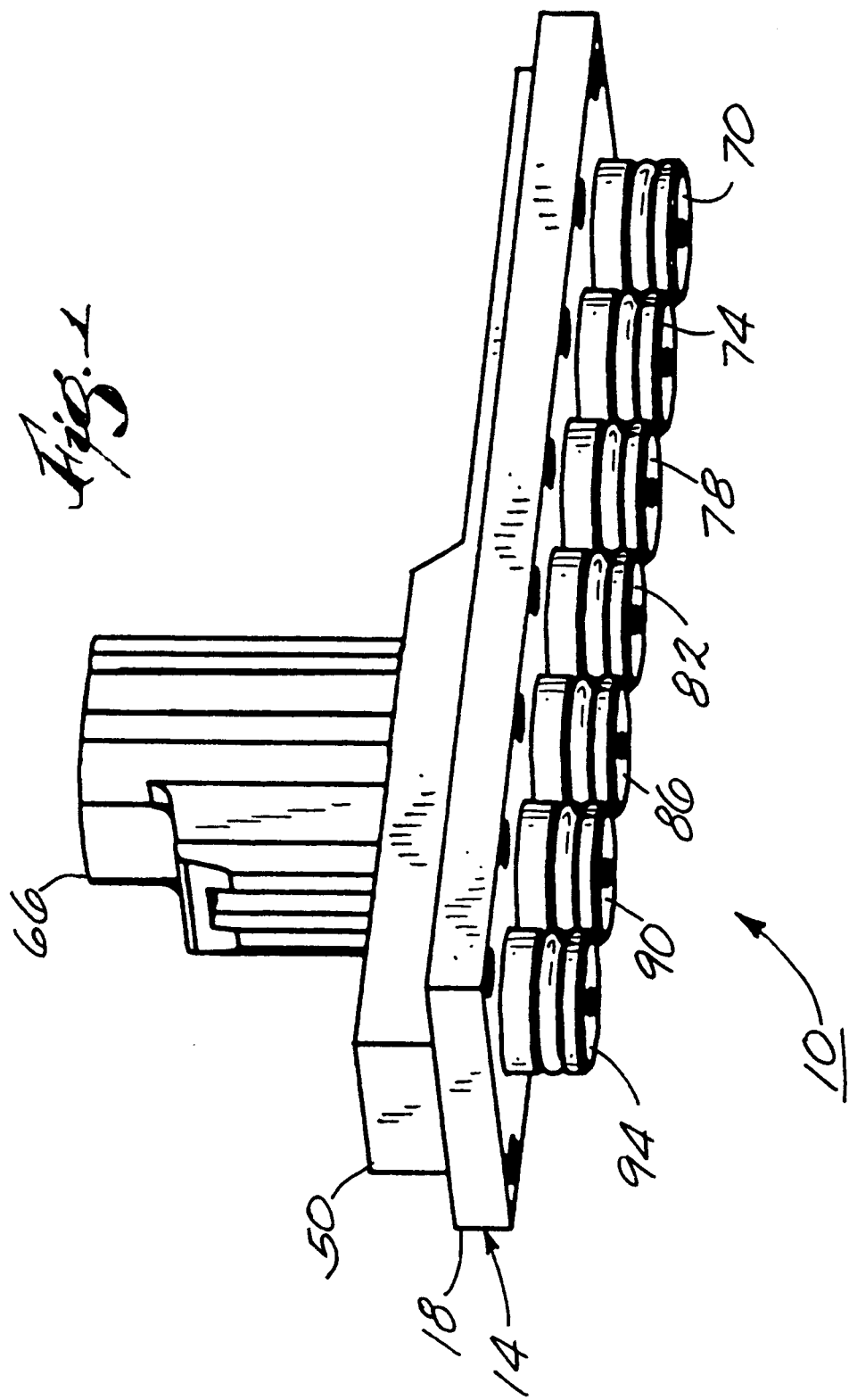
FIG. 1 is a perspective view of the housing for the sensors.
Figure 2:
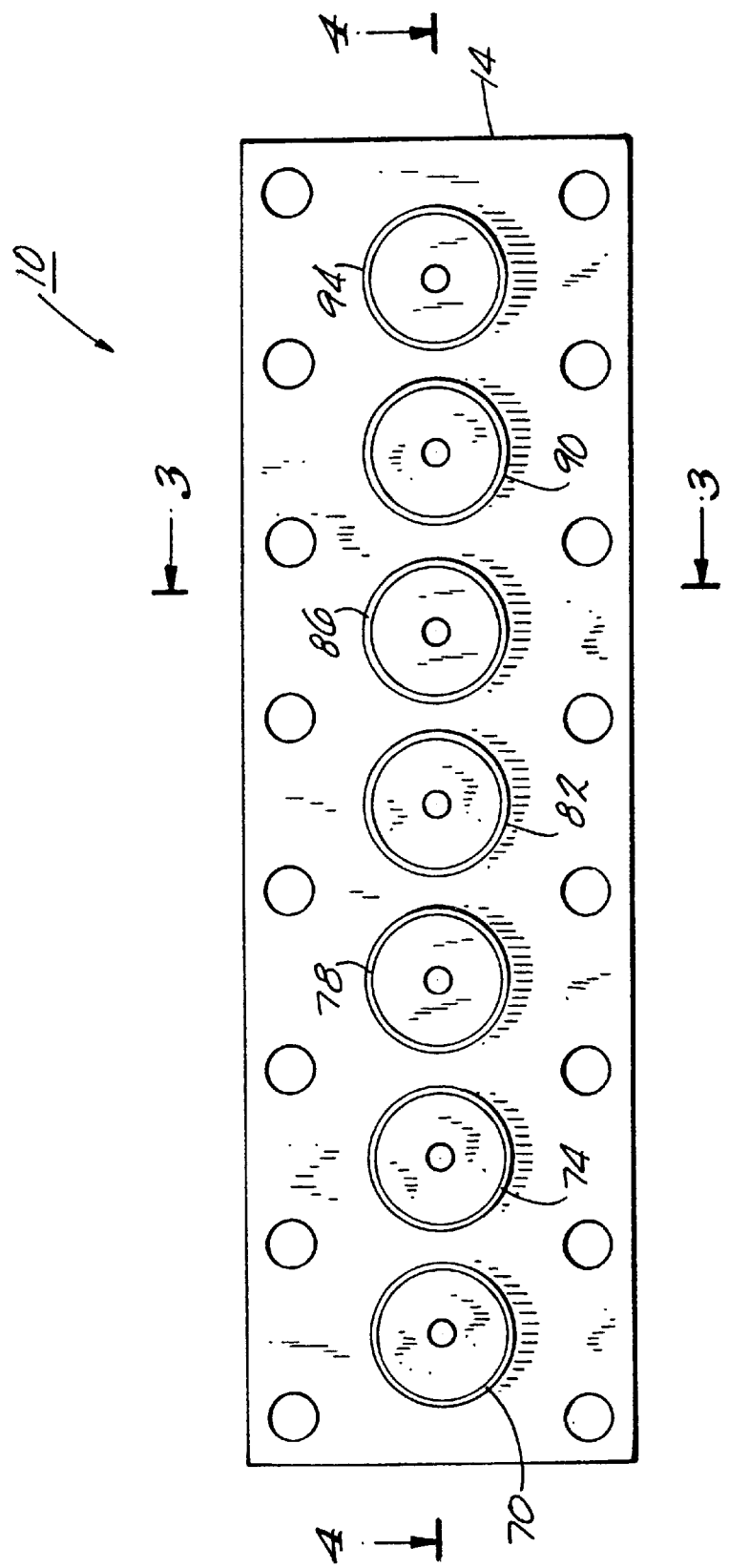
FIG. 2 is a top view of the housing shown in FIG. 1.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Shown in FIG. 1 of the drawings is a sensing system 10 embodying the invention. The system 10 includes a housing 14. As shown clearly in FIG. 4, the housing 14 has a base 18 including seven apertures 22, 26, 30, 34, 38, 42, and 46 in the base 18. A cap 50 fits over the base 18 to enclose a circuit board 54. A custom ASIC 58 is mounted on the circuit board 54 and a pair of electrically conductive terminals 62 are mounted to the circuit board 54 and extend through a connector portion 66 of the cap 50 so that the housing 14 can be plugged into a socket (not shown), thereby connecting the sensing system 10 to a source of electrical power as well as instrumentation that receives an output.

The housing 14 also includes seven individually packaged sensors or transducers 70, 74, 78, 82, 86, 90, and 94 mounted in seven respective bosses 192, 194, 196, 198, 200, 202, 204. The bosses 192, 194, 196, 198, 200, 202, 204 are of an appropriate size to be retained by the respective apertures, 22, 26, 30, 34, 38, 42, and 46 of the base 18 (shown in FIG. 4). Preferably, the sensors 70, 74, 78, 82, 86, 90, and 94 are aligned with a common axis.

As shown in FIG. 1, each of the sensors is substantially similar, and accordingly, only one sensor 86 will be described in detail. Preferably, the sensor 86 includes a sensing chip 98. While any appropriate semiconductor sensing chip or transducer is appropriate, the sensor of the preferred embodiment is a pressure sensor having a polysilicon surface micromachined pressure sensing chip as shown and described in U.S. Pat. No. 5,507,171, which is incorporated herein by reference.

Figure 3:
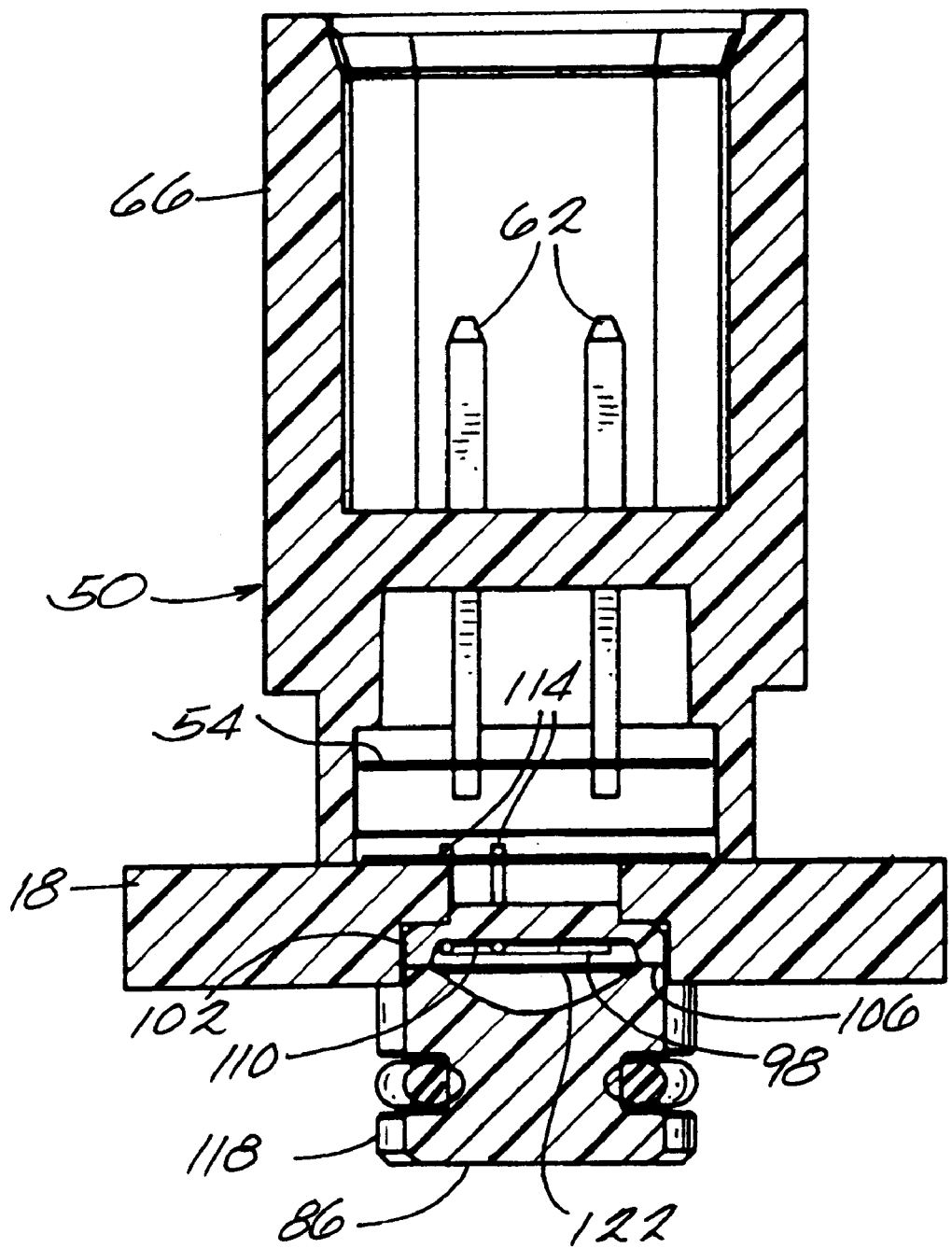
FIG. 3 is a view taken along line 3—3 in FIG. 2.

As shown in FIG. 3, the pressure sensor 86 also includes a base portion 102 having a surface 106 defining a recess 110. The polysilicon surface micromachined pressure sensing chip is mounted in the recess and is wire-bonded to a pair of electrically conducting shunts 114 that extend through the base portion 102 and that are connected to circuit board 54. The recess is filled with a non-corrosive, pressure transmitting fluid or oil (not shown). The pressure sensor 86 also includes a cap portion 118 mounted on the base portion 102. A diaphragm 122 is positioned between the cap portion 118 and the base portion 102 to seal the pressure sensing chip 98 and the fluid in the recess 110.

Figure 4:
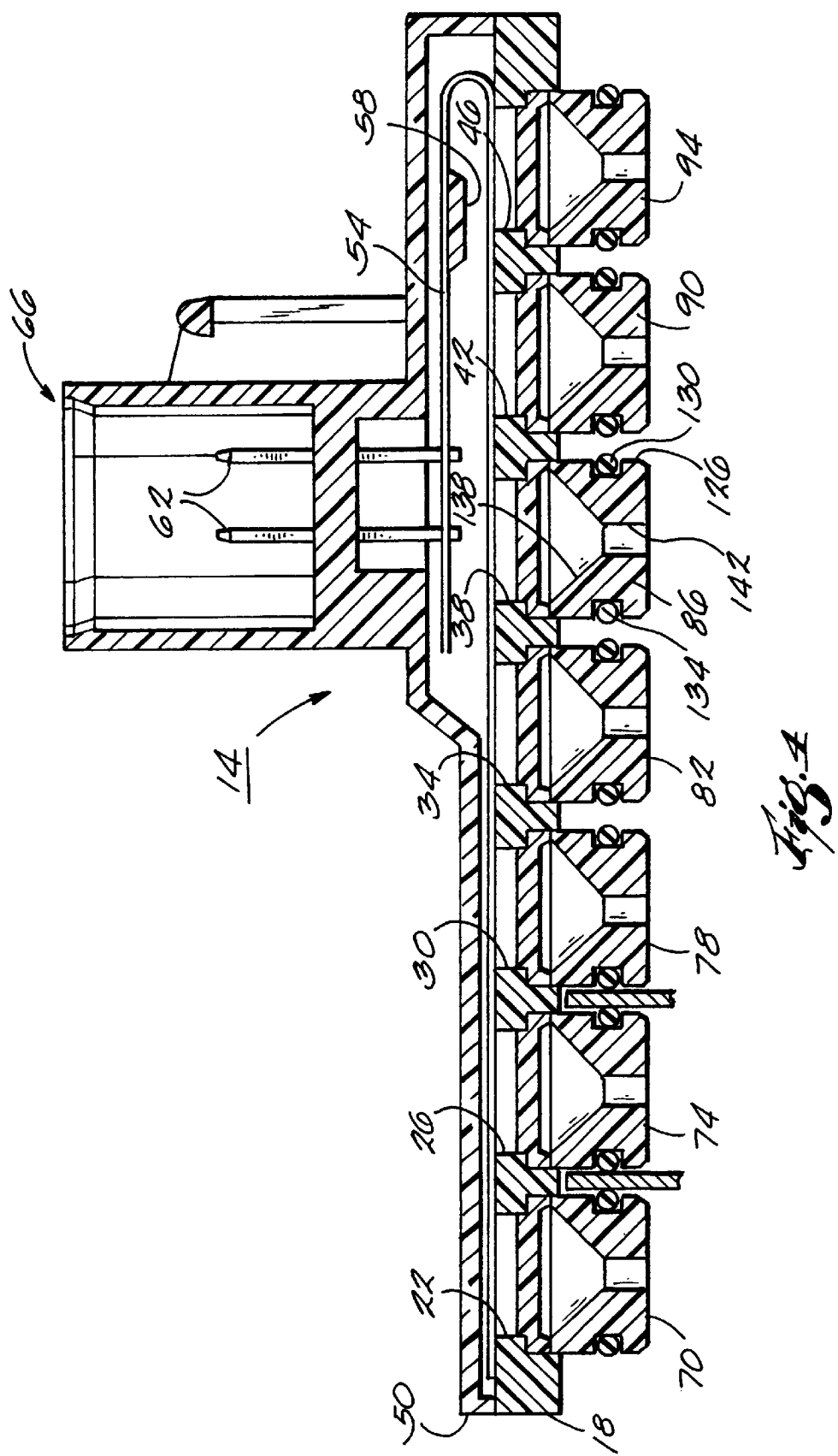
FIG. 4 is a view taken along line 4—4 in FIG. 2.

As best shown in FIG. 4, the cap portion 118 also includes an outer surface 126 having an annular recess 130 in which is mounted an o-ring 134. An inner surface 138 and a bore 142 extending between the outer surface 126 and the inner surface 138 allow a fluid pressure line (not shown) to be connected to the pressure sensor 86 to thereby transmit fluid pressure to the diaphragm. The diaphragm then transmits the fluid pressure to the fluid in the recess, which, in turn, transmits the fluid pressure to the pressure sensing chip.

Figure 5:
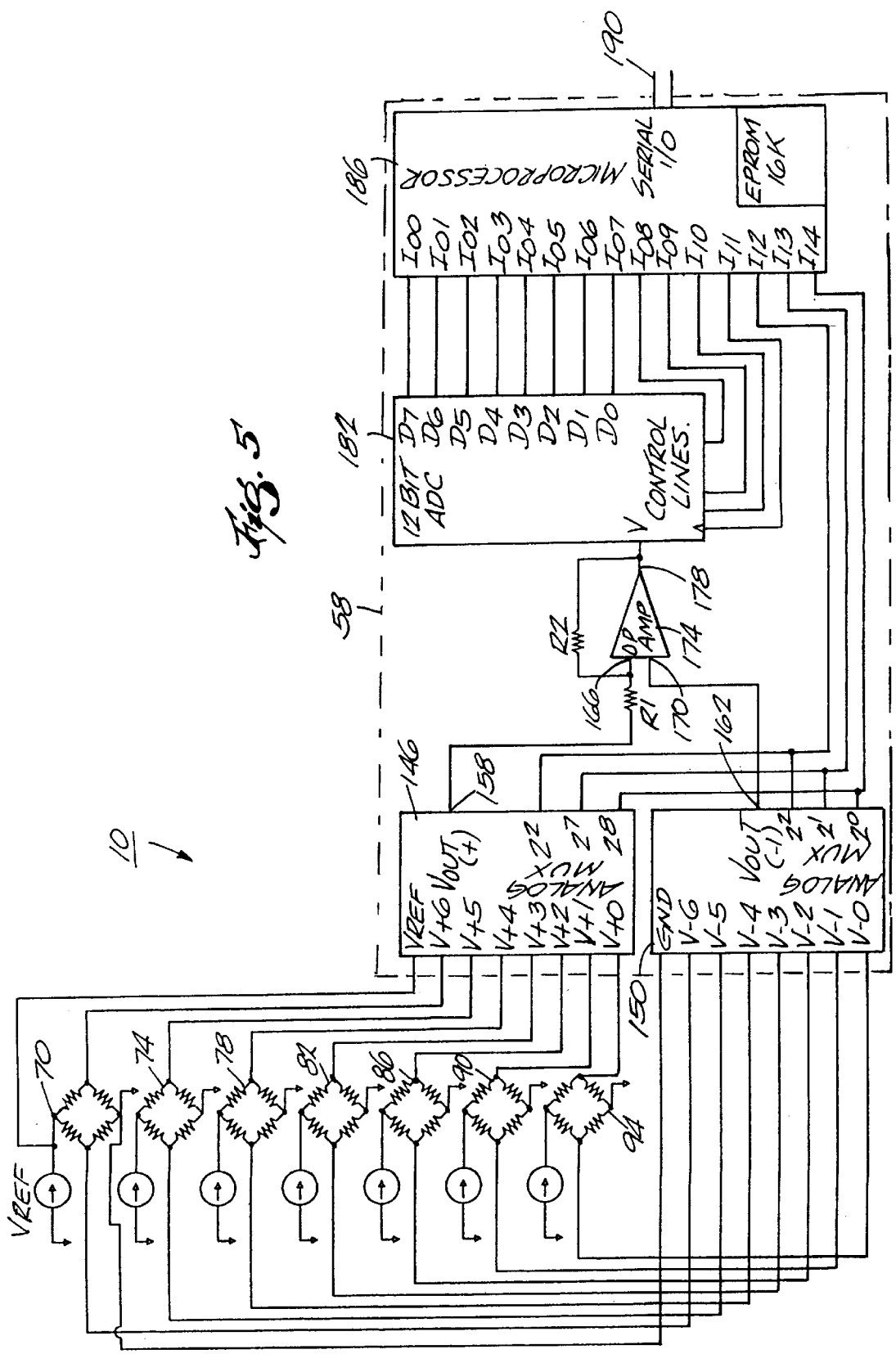
FIG. 5 is a schematic diagram of the sensors, the signal conditioning circuitry, and the temperature compensation circuitry embodying the invention.

Referring now to FIG. 5, the pressure sensors 70, 74, 78, 82, 86, 90 and 94 are connected to the custom ASIC 58. The custom ASIC 58 includes a pair of analog multiplexers 146 and 150. The multiplexers 146 and 150 have outputs 158 and 162, respectively, connected to inputs 166 and 170, respectively, of a differential amplifier 174. The output 178 of the differential amplifier 174 is input to a 12 bit analog to digital converter 182 which is connected to a microprocessor 186. The custom ASIC amplifies the pressure sensor signals, provides temperature compensation for the pressure sensor signals and generates a composite output 190 that is representative of the pressures measured by each of the discrete pressure sensors.

Figure 6:
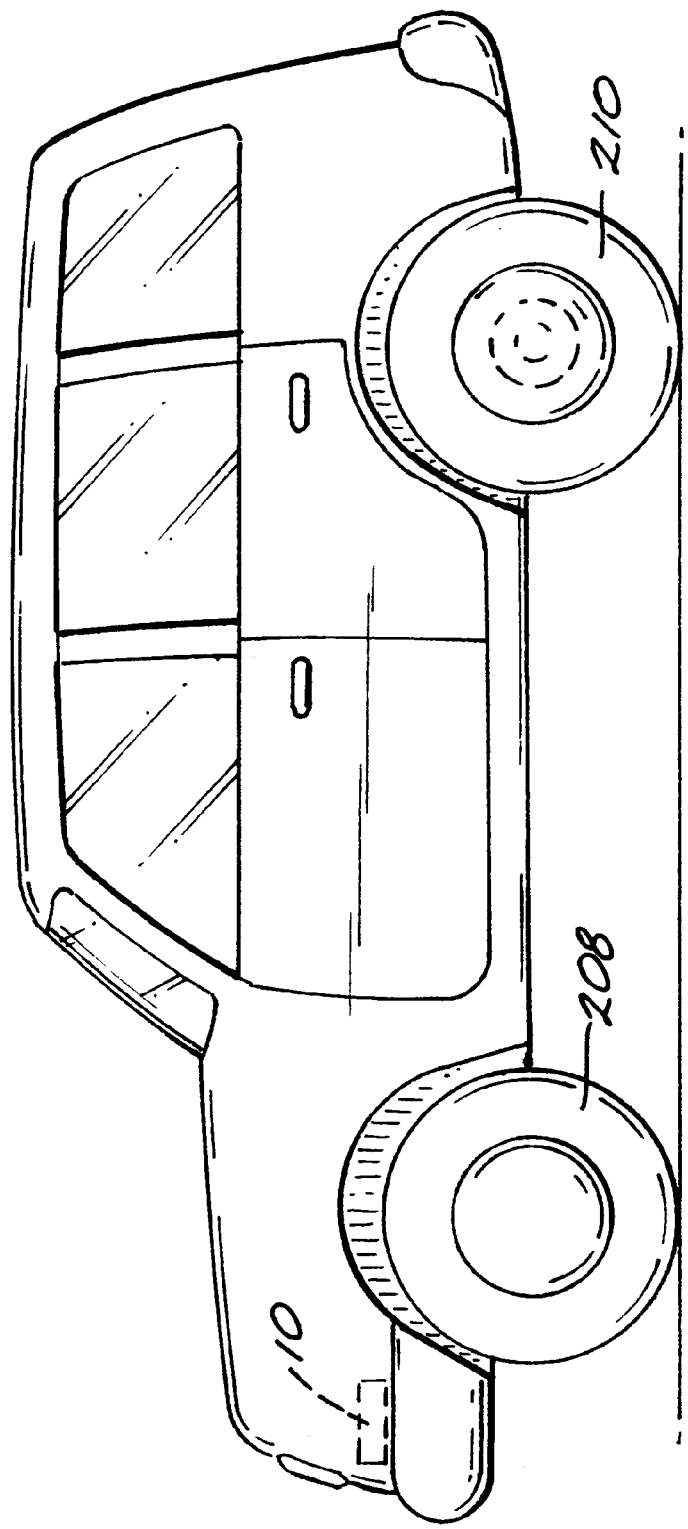
FIG. 6 is a side perspective view of the sensors mounted within a vehicle.

In operation, the sensors or transducers, 70, 74, 78, 82, 86, 90 and 94 can be installed in any structure or machine. In the motor vehicle 206 of FIG. 6, sensors can monitor either manual and antilock brakes, for example. Brake pressure is monitored by the sensing system 10 that preferably tracks brake pressure at each of the four wheels 208 and 210 (two wheels not shown). The sensing system 10, provides a rapid synthesis of multiple inputs eliminating the additional processing delays that could lead to dangerous accidents.

Various features and advantages of the invention are set forth in the following claims.

What is claimed is:

1. An apparatus for measuring fluid pressures, said apparatus comprising:

a housing;

a plurality of pressure sensors mounted on said housing, each of said pressure sensors including a pressure sensing element and an electrical output connected to said pressure sensing element;

a plurality of fluid pressure inputs connected to said pressure sensors, respectively; and a circuit mounted in said housing and in electrical connection with said electrical outputs to provide a common signal conditioner for said pressure sensors.

2. An apparatus as set forth in claim 1 wherein said signal conditioner includes a temperature compensating circuit.

3. An apparatus as set forth in claim 1 wherein said signal conditioner includes a digitizing circuit.

4. An apparatus as set forth in claim 1 wherein said housing is connected to a motorized vehicle having a brake system.

5. An apparatus as set forth in claim 4 wherein at least one of said inputs is connected to said braking system.

6. An apparatus as set forth in claim 1 wherein said circuit is mounted adjacent to said pressure sensors.

7. An apparatus as set forth in claim 1 wherein said signal conditioner includes a digitizing circuit.

8. An apparatus as set forth in claim 1 wherein said signal conditioner includes a temperature compensating circuit.

9. An apparatus as set forth in claim 1 wherein said plurality of pressure sensors is mounted on said housing along a common axis.

10. An apparatus for measuring fluid pressures, said apparatus comprising:

a housing;

a plurality of pressure sensors mounted on said housing along a common axis, each of said pressure sensors including a pressure sensing element and an electrical output connected to said pressure sensing element;

a plurality of fluid pressure inputs connected to said pressure sensors, respectively; and a circuit mounted in said housing in electrical connection with said electrical outputs, said circuit including a digitizing circuit providing a common signal conditioner for said pressure sensors.

* * * * *